A. R. MILLER.
HARVESTER.
APPLICATION FILED JULY 30, 1918.
1,293,857.
Patented Feb. 11, 1919.
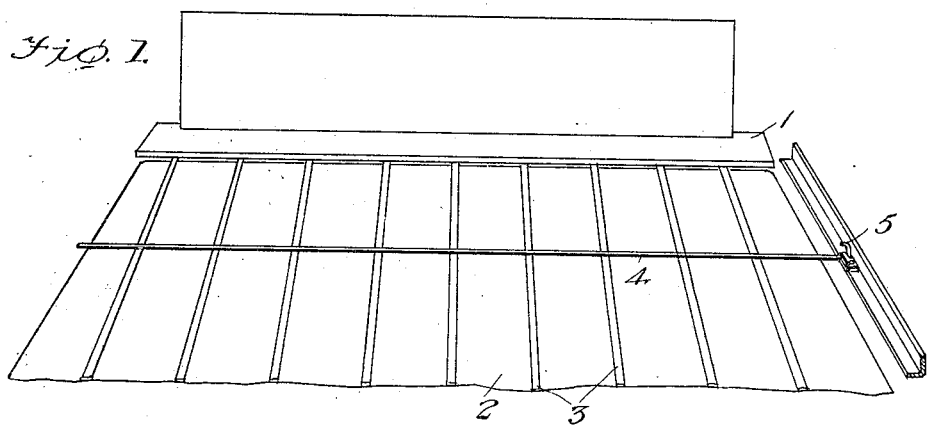
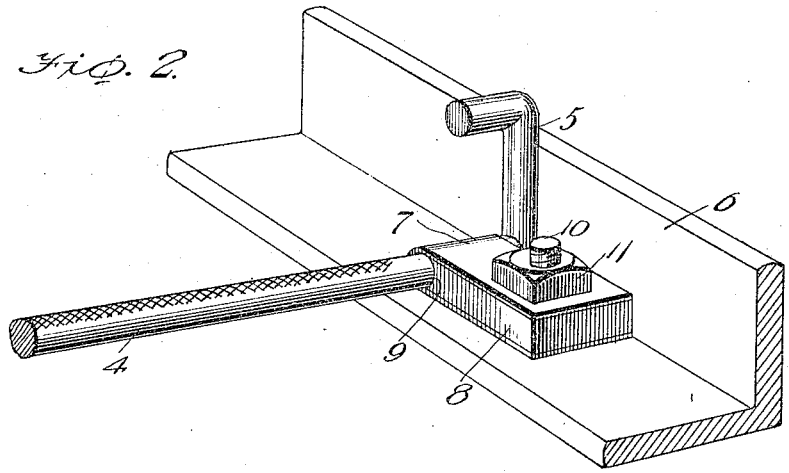
WITNESSES
R&Rousseau.
INVENTOR
A. R. Miller,
BY
ATTORNEYS

UNITED STATES PATENT OFFICE.

ABRAM R. MILLER, OF DENISON, IOWA.

HARVESTER.

1,293,857.  Specification of Letters Patent.  Patented Feb. 11, 1919.

Application filed July 30, 1918. Serial No. 247,455.

*To all whom it may concern:*

Be it known that I, ABRAM R. MILLER, a citizen of the United States, and a resident of Denison, in the county of Crawford and State of Iowa, have invented certain new and useful Improvements in Harvesters, of which the following is a specification.

My invention is an improvement in harvesters, and has for its object to provide means in connection with the draper of a binder or other harvester which receives the cut grain from the sickle for insuring the even placing of the cut grain on the draper.

In the drawings:

Figure 1 is a perspective view of a portion of the draper of a harvester receiving the cut grain from the sickle, looking from the front; and Fig. 2 is a perspective view of one end of the evening rod showing its mounting.

The present embodiment of the invention is shown in connection with the draper or endless conveyer of a binder, a portion of whose frame is indicated at 1, the said draper comprising an endless belt 2 having transverse slats 3, and the draper is mounted in the usual manner. This draper receives the cut grain from the sickle which is arranged in front of the same, and in the usual construction the cut ends of the grain are delayed by the action of the sickle and by the uncut grain, so that the head ends of the stalks begin to move toward the binding apparatus before the cut or butt ends, and the straw is thus laid unevenly on the draper.

The improvement comprises a rod 4 of suitable cross section, having at one end a crank 5, the said crank being formed by bending the end of the rod at right angles and then substantially parallel with the body of the rod, as shown. This end of the rod is rotatably connected with an angle plate 6 of the frame at the outer end of the draper, by means of a substantially U-shaped strap 7 and a block 8. One end of the block is concaved as shown at 9 to receive the rod and the strap fits over the rod, holding it in the recess of the block.

A bolt 10 is passed through registering openings in the angle plate, the block and the strap, and is engaged by a nut 11 above the upper member of the strap. Referring to Fig. 2 it will be noticed that the upper face of the rod, that is, that surface adjacent to the crank 5, is roughened, either by corrugations, checkering or the like. This rod 4 is arranged at about the middle of the upper run of the draper, and the cut grain falling thereon will be retarded at the head end and straightened, so that it will travel evenly to the binder.

The purpose of the crank 5 is to bring the serrations on the rod 4 to any desired point, as, for instance, to bring the serrations forwardly or rearwardly or directly upward, and the crank, being in line with the serrations, indicates by its position the position of the serrations. If it is desired to delay the straw to a greater extent the serrations are turned directly upward, as shown in Fig. 2. If it is not desired to delay the straw so greatly, they may be turned forwardly or backwardly to any desired degree.

I claim:

In a harvester, the combination with the draper for receiving cut grain, of means for retarding the headed ends of the straw to insure the even laying of the straw on the draper, said means comprising a rod having at one end a crank and having the said end rotatably connected with a fixed portion of the binder frame at approximately the center of the draper, the rod being frictionally held in the rotatable connection to hold the same in operative position, said rod having a roughened surface extending longitudinally thereof, the rod being rotatable to bring the roughened surface in desired operative position.

ABRAM R. MILLER.

Witnesses to signature:
H. BEARDSLEY,
FRANK FAUL.

Copies of this patent may be obtained for five cents each, by addressing the "Commissioner of Patents, Washington, D. C."